United States Patent
Yi et al.

(10) Patent No.: US 9,526,390 B2
(45) Date of Patent: Dec. 27, 2016

(54) ROBOT CLEANER

(71) Applicant: LG Electronics Inc., Seoul (KR)

(72) Inventors: Sihyuk Yi, Seoul (KR); Hyukdo Kweon, Seoul (KR); Wooyeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/000,424

(22) Filed: Jan. 19, 2016

(65) Prior Publication Data

US 2016/0206170 A1 Jul. 21, 2016

(30) Foreign Application Priority Data

Jan. 20, 2015 (KR) .................. 10-2015-0009428
Mar. 2, 2015 (KR) .................. 10-2015-0029299

(51) Int. Cl.
| | |
|---|---|
| *B08B 3/00* | (2006.01) |
| *A47L 9/28* | (2006.01) |
| *B25J 11/00* | (2006.01) |
| *B25J 9/16* | (2006.01) |
| *A47L 9/00* | (2006.01) |
| *G05D 1/02* | (2006.01) |

(52) U.S. Cl.
CPC ........... *A47L 9/2826* (2013.01); *A47L 9/00* (2013.01); *A47L 9/2852* (2013.01); *B25J 9/1664* (2013.01); *B25J 9/1694* (2013.01); *B25J 11/0085* (2013.01); *G05D 1/0223* (2013.01); *A47L 2201/06* (2013.01); *G05D 2201/0215* (2013.01); *Y10S 901/01* (2013.01)

(58) Field of Classification Search
None
See application file for complete search history.

(56) References Cited

U.S. PATENT DOCUMENTS

| | | | |
|---|---|---|---|
| 2005/0166355 A1* | 8/2005 | Tani | ............ A47L 9/2805 15/319 |
| 2006/0253224 A1 | 11/2006 | Tani et al. | |
| 2014/0124004 A1 | 5/2014 | Rosenstein et al. | |

FOREIGN PATENT DOCUMENTS

| | | |
|---|---|---|
| CN | 202 739 908 | 2/2013 |
| EP | 2 438 843 | 4/2012 |
| KR | 2011-0127946 | 11/2011 |

OTHER PUBLICATIONS

European Search Report dated Jun. 9, 2016 issued in Application No. 16151873.3.

* cited by examiner

*Primary Examiner* — Eric Golightly
(74) *Attorney, Agent, or Firm* — KED & Associates, LLP (57) ABSTRACT

A robot cleaner includes a main body that defines an external appearance of the robot cleaner. The robot cleaner further includes a plurality of dust sensors that are located at different positions on the main body and that are configured to sense dust that is located in a traveling route of the robot cleaner. The robot cleaner further includes a control unit that is configured to control movement and a cleaning operation of the robot cleaner based on sensing data from the plurality of dust sensors.

13 Claims, 5 Drawing Sheets

ROBOT CLEANER

CROSS-REFERENCE TO RELATED APPLICATION

Pursuant to 35 U.S.C. §119(a), this application claims the benefit of earlier filing date and right of priority to Korean Application No. 10-2015-0009428, filed on Jan. 20, 2015 and Korean Application No. 10-2015-0029299, filed on Mar. 2, 2015, the contents of which is incorporated by reference herein in its entirety.

FIELD

The present disclosure relates to a robot cleaner.

BACKGROUND

In general, a robot has been developed for an industrial purpose and has been in charge of part of factory automation. Recently, robot-applied fields has further extended to develop medical robots or aerospace robots, and home robots that may be used in general houses have also been made.

A typical example of home robots is a robot cleaner which is a sort of an electronic device for performing cleaning by sucking ambient dust or foreign objects, while traveling a predetermined area.

The robot cleaner checks dust sensed during traveling using a dust sensor, and performs cleaning in such a manner of cleaning the checked dust.

SUMMARY

According to an innovative aspect of the subject matter described in this application, a robot cleaner includes a main body that defines an external appearance of the robot cleaner; a plurality of dust sensors that are located at different positions on the main body and that are configured to sense dust that is located in a traveling route of the robot cleaner; and a control unit that is configured to control movement and a cleaning operation of the robot cleaner based on sensing data from the plurality of dust sensors.

The robot cleaner may include one or more of the following optional features. The plurality of dust sensors are located in positions at which the plurality of dust sensors pass through a same point based on the robot cleaner traveling in a linear direction or based on the robot cleaner rotating. The plurality of dust sensors include a first sensor that is located on a front side of the main body and that is configured to sense dust that is located in the traveling route before the robot cleaner passes dust; and a second sensor that is located on a rear side of the main body and that is configured to sense dust that is located in the traveling route after the robot cleaner passes dust. The control unit is configured to recognize a current position of the robot cleaner, obtain coordinates of the current position, and control the movement and the cleaning operation of the robot cleaner based on the coordinates of the current position and the sensing data from the plurality of dust sensors. The control unit is configured to control the robot cleaner to clean a cleaning area based on comparing a first sensing data of the first sensor to a preset first reference.

Based on the first sensing data exceeding the preset first reference, the control unit is configured to store coordinates of the cleaning area, designate the cleaning area as an intensive cleaning target area, and control the robot cleaner to intensively clean the cleaning area based on the coordinates of the intensive cleaning target area. Based on the cleaning area being intensively cleaned, the control unit is configured to reduce a speed of the robot cleaner, increase a dust suction force of the robot cleaner, or repeatedly clean the cleaning area a plurality of times by controlling the robot cleaner. The control unit is configured to control movement and the cleaning operation of the robot cleaner based on comparing a difference between the first sensing data and a second sensing data of the second sensor to a preset second reference after the cleaning area is cleaned. Based on the difference between the first sensing data and the second sensing data exceeding the preset second reference, the control unit is configured to control the robot cleaner to move the robot cleaner to an area other than the cleaning area.

Based on the difference between the first sensing data and the second sensing data being lower than the preset second reference. Based on the cleaning area being a general cleaning target area, the control unit is configured to control the robot cleaner to move to an area other than the cleaning area. Based on the cleaning area being the intensive cleaning target area, the control unit is configured to control the robot cleaner to repeat cleaning of the cleaning area. Based on the robot cleaner repeating cleaning of the cleaning area, the control unit is configured to control the robot cleaner to intensively clean the cleaning area. Based on the robot cleaner repeating cleaning of the cleaning area, the control unit is configured to control the robot cleaner to clean an area other than the cleaning area, and after cleaning the area other than the cleaning area, repeating cleaning of the cleaning area.

Based on the robot cleaner repeating cleaning of the cleaning area, the control unit is configured to control the robot cleaner to immediately repeat cleaning of the cleaning area. The control unit is configured to control the robot cleaner to return to the cleaning area without rotating the robot cleaner and repeat cleaning of the cleaning area. The control unit is configured to rotate the robot cleaner 180 degrees, move the robot cleaner toward the cleaning area, and repeat cleaning of the cleaning area. The control unit is configured to control the robot cleaner to traverses the cleaning area a plurality of times until the first sensing data is lower than the preset first reference. After the robot cleaner traverses the cleaning area a preset number of times and based on the first sensing data being than the preset first reference, the control unit is configured to control the robot cleaner to stop cleaning.

According to another innovative aspect of the subject matter described in this application, a method for controlling a robot cleaner includes the actions of setting a traveling route and a cleaning mode; cleaning a cleaning area that is located along the traveling route according to the cleaning mode; sensing dust in the cleaning area by a plurality of dust sensors that are located in a main body of the robot cleaner and that include a first sensor and a second sensor; obtaining coordinates of a current position; determining whether to intensively clean by comparing a first sensing result of a first sensor to a preset first reference; based on determining whether to intensively clean, cleaning the cleaning area; determining a cleaning state of the cleaning area by comparing a difference between the first sensing result and a second sensing result of a second sensor to a second reference; and based on determining the cleaning state of the cleaning area, controlling cleaning and movement of the robot cleaner.

The method may include one or more of the following optional features. The plurality of duct sensors are located in positions at which the plurality of dust sensors pass through, within a reference range, the same point based on the robot cleaner traveling in a linear direction or based on the robot cleaner rotating. The first sensor is located on a front side of the main body and is configured to sense dust that is located in a traveling route before the robot cleaner passes dust. The second sensor is located on a rear side of the main body and is configured to sense dust that is located in the traveling route after the robot cleaner passes dust. The action of obtaining coordinates of the current position includes obtaining, in real time, the coordinates of the cleaning position; and storing, as a general cleaning target area, coordinates of the cleaning area.

The action of comparing a first sensing result of a first sensor to a preset first reference includes based on the first sensing result being equal to or less than the preset first reference, maintaining, as a general cleaning target area, coordinates of the cleaning area; and maintaining the cleaning state of the cleaning area, and based on the first sensing result exceeding the first reference, designating the coordinates of the cleaning area as an intensive cleaning target area; and designating the cleaning state to be intensively cleaned. The action of determining a cleaning state of the cleaning area includes based on the difference between the first sensing result and the second sensing result exceeding the preset second reference, determining to clean an area other than the cleaning area, based on the difference between the first sensing result and the second sensing result being equal to or less than the preset second reference and the cleaning area not being designated to be intensively cleaned, determining to clean an area other than the cleaning area, and based on the difference between the first sensing result and the second sensing result being equal to or less than the preset second reference and the cleaning area being designated to be intensively cleaned, determining to repeat cleaning of the cleaning area.

Therefore, an object of the present disclosure is to provide a robot cleaner capable of performing cleaning by determining a cleaning state of a cleaning area, and a method for controlling a robot cleaner.

DETAILED DESCRIPTION

Figure 1:
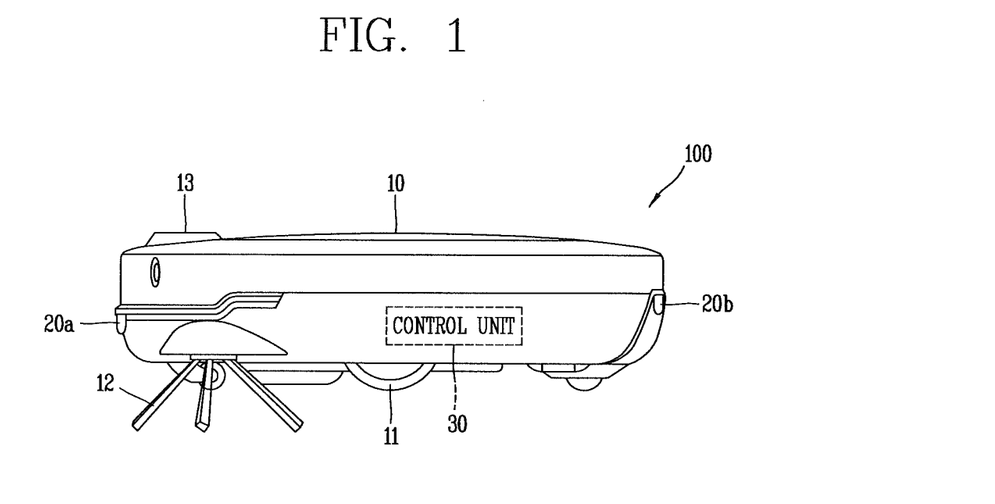
FIG. 1 is a side view of an example robot cleaner.
Figure 2:
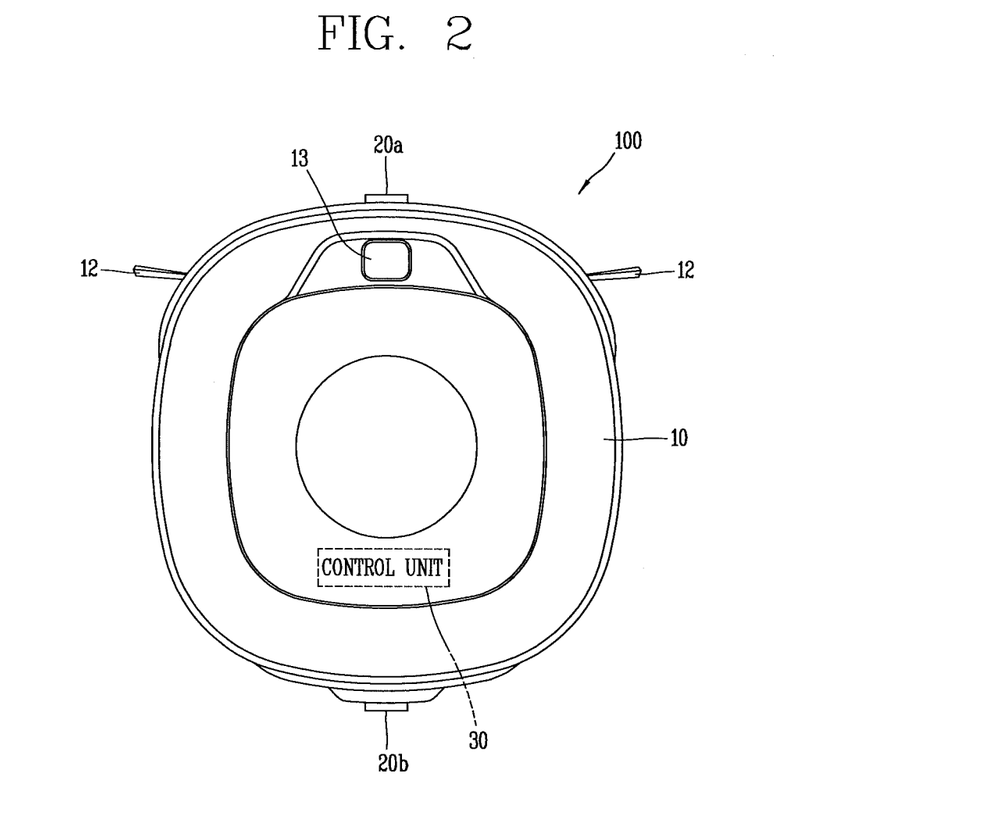
FIG. 2 is a plan view of an example robot cleaner.
Figure 3:
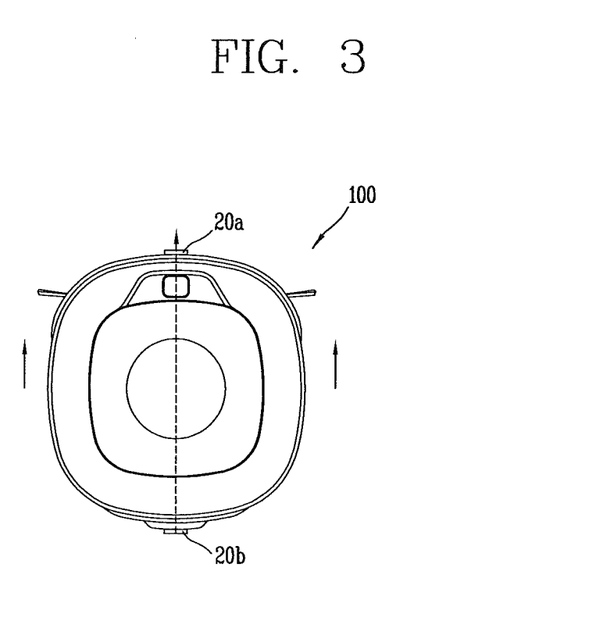
FIGS. 3 and 4 are views of example dust sensors of a robot cleaner.
Figure 4:
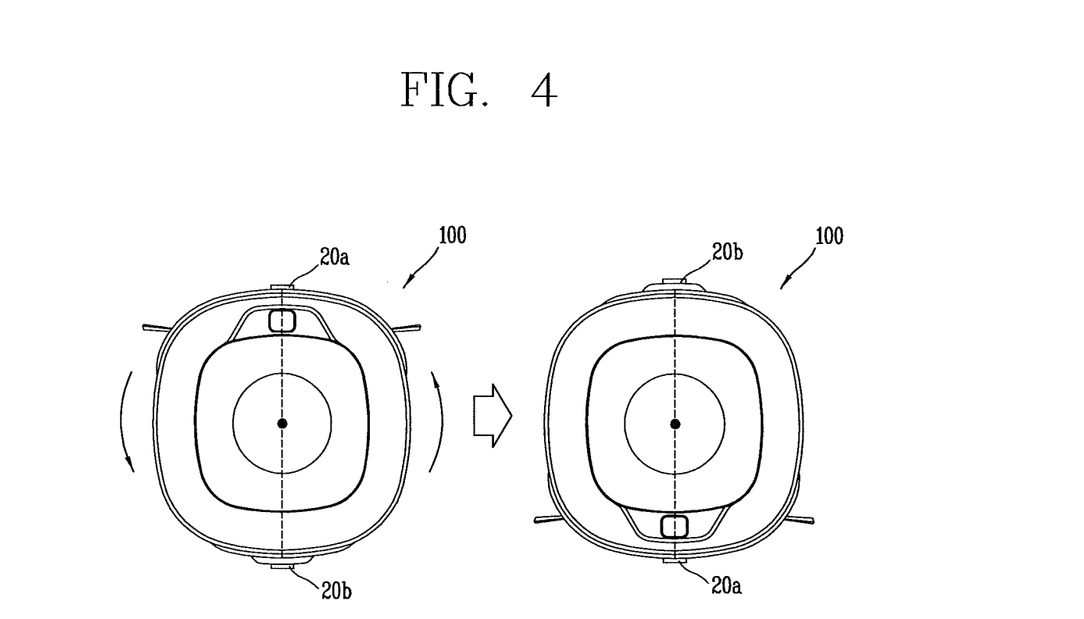
Figure 5:
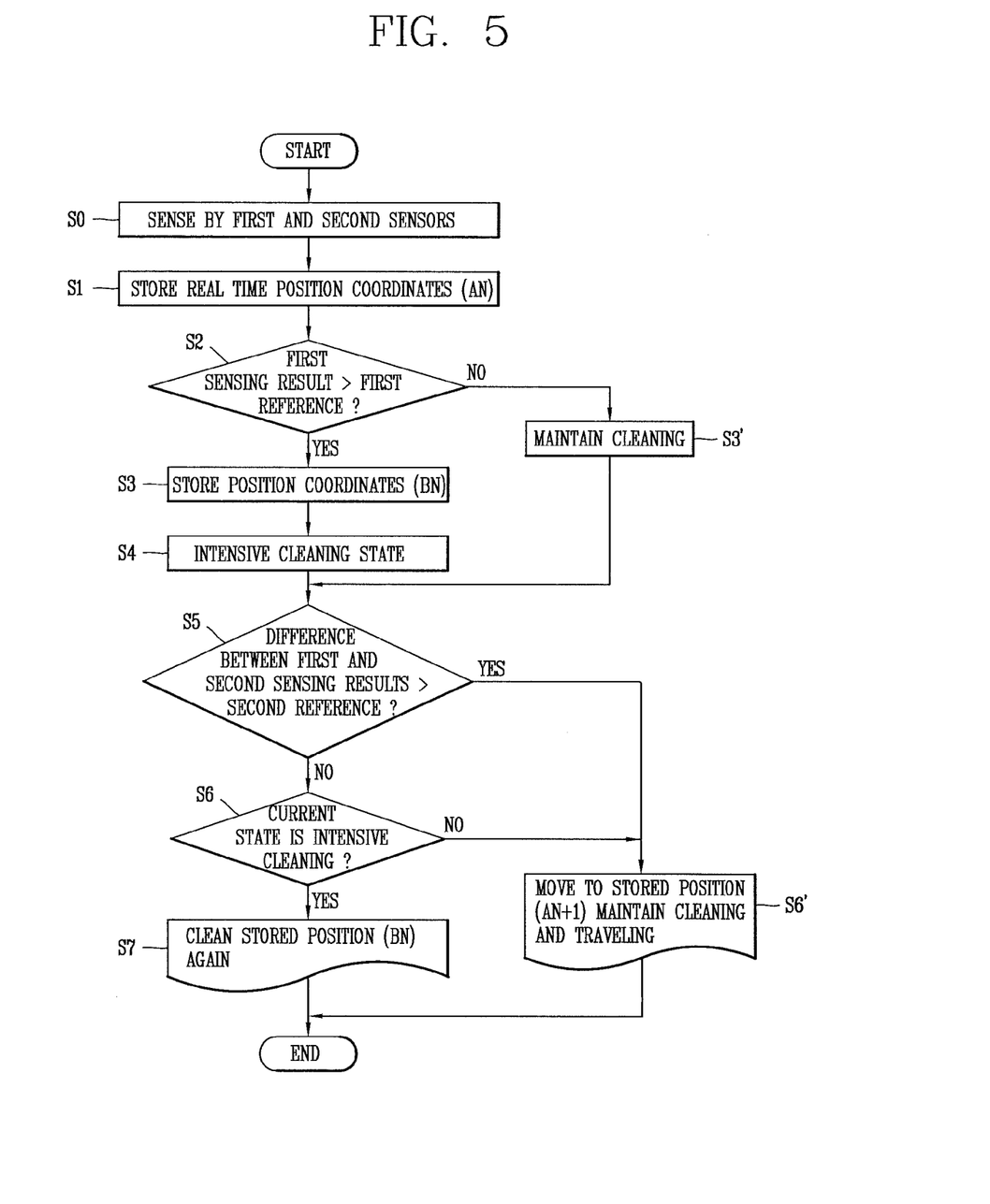
FIG. 5 is a flow chart of an example cleaning operation of an example robot cleaner.
Figure 6:
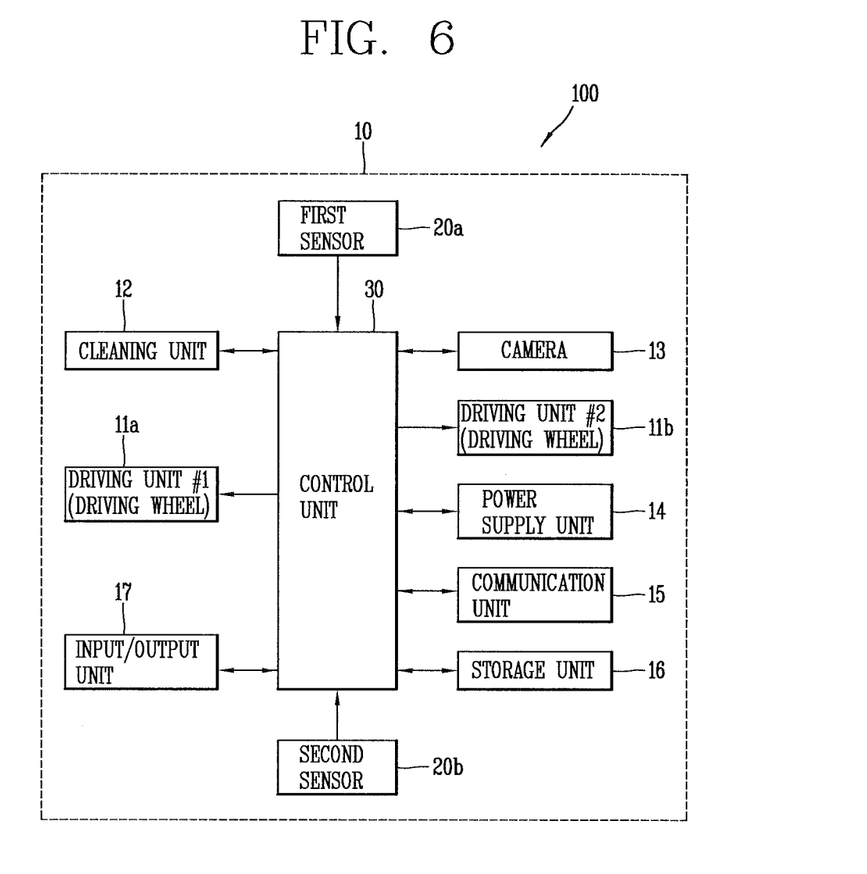
FIG. 6 is a block diagram of example functional components of an example control unit of a robot cleaner.

FIGS. 1 and 2 illustrate example robot cleaners. FIGS. 3 and 4 illustrate example dust sensors of example robot cleaners. FIG. 5 illustrates an example cleaning operation of an example robot cleaner. FIG. 6 illustrates example functional components of an example control unit of a robot cleaner.

The robot cleaner (hereinafter, will be referred to as a "cleaner") may have a configuration as illustrated in FIGS. 1 and 2.

First, an example configuration of the cleaner will be described with reference to FIG. 1.

As illustrated in FIG. 1, the cleaner 100 includes a main body 10 forming an external appearance, a plurality of dust sensors 20a and 20b sensing dust in a traveling path of the main body 10, and a control unit 30 controlling traveling and cleaning of the main body 10 on the basis of the sensing result from the plurality of dust sensors 20a and 20b.

The control unit 100 may be a cleaning robot performing cleaning while traveling.

The cleaner 100 may automatically perform traveling and cleaning.

The cleaner 100 may perform traveling and cleaning according to a user manipulation.

The cleaner 100 may include a plurality of components for traveling and cleaning.

In the cleaner 100, the main body 10 may form an external appearance of the cleaner 100 and perform traveling and cleaning.

In some implementations, the main body 10 may perform a general operation of the cleaner 100.

The main body 10 may include components for traveling and cleaning of the cleaner 100.

The main body 10 may be configured to facilitate traveling and cleaning and form an external appearance of the cleaner 100.

For example, the main body 10 may have a circular shape and may have a quadrangular shape with rounded corners.

The main body 10 may include components for traveling and cleaning of the cleaner 100 internally or externally.

For example, components for performing a cleaning operation or sensing may be provided at an outer side, while components for controlling the cleaner 100 may be provided at an inner side.

In the cleaner 100, the plurality of dust sensors 20a and 20b may be provided at different positions of the main body 10 and sense dust in a traveling route of the main body 10 to perform a sensing operation for traveling and cleaning.

The plurality of dust sensors 20a and 20b may be sensors for sensing dust in the traveling route when the main body 10 travels the traveling route.

The plurality of dust sensors 20a and 20b may be provided at an outer side of the main body 10 to sense dust in the traveling route.

The plurality of dust sensors 20a and 20b may be at least two or more sensors.

The plurality of dust sensors 20a and 20b may sense dust in the traveling route and determine a degree of dust in the traveling route.

The plurality of dust sensors 20a and 20b may sense dust in the traveling route and determine a degree of dust in the traveling route.

The plurality of dust sensors 20a and 20b may sense dust in the traveling route and generate a signal regarding the sensing result.

The signal regarding the sensing result may be used as a basis for controlling traveling and cleaning of the main body 10.

The plurality of dust sensors 20a and 20b may generate the signal regarding the sensing result and deliver the generated signal to the control unit 30.

In the cleaner 100, the control unit 30 may control traveling and cleaning of the main body 10 on the basis of the sensing result from the plurality of dust sensors 20a and 20b to control an operation of the cleaner 100.

The control unit 30 may be a central processing unit of the cleaner 100.

The control unit 30 may be provided within the main body 10.

The control unit 30 may include a plurality of circuit components.

The control unit 30 may be connected to other components included in the main body 10 and cause various functions of the main body 10 to be performed.

For example, the control unit 30 may be connected to an output device provided outside of the main body 10 and control the output device to output a sound or a screen display.

In some implementations, the control unit 30 may drive the main body 10, process data, and perform communication with an external device, as well as controlling traveling and cleaning of the main body 10.

Hereinafter, an example cleaner 100 will be described with reference to FIGS. 2 through 6.

The cleaner 100 may include the main body 10, the plurality of dust sensors 20a and 20b, and the control unit 30 and may have such a shape as illustrated in FIGS. 1 and 2.

FIGS. 1 and 2 illustrate an example cleaners 100. The cleaner 100 may have such a shape as illustrated in FIGS. 1 and 2, but the present disclosure is not limited thereto. A shape of an external appearance of the cleaner 100 and a configuration thereof illustrated in FIGS. 1 and 2 may be modified to have various other shapes.

The main body 10 may include at least one driving wheel 11 enabling the main body 10 to travel, and a cleaning unit 12 for removing dust.

The at least one driving wheel 11 may be a wheel moving the main body 10.

The at least one driving wheel 11 may move the main body 10 to enable the main body 10 to travel.

In some implementations, the at least one driving wheel 11 may enable the cleaner 100 to travel.

The at least one driving wheel 11 may be provided on a lower portion of the main body 10.

In some implementations, the at least one driving wheel 11 may be formed as a pair.

The at least one driving wheel 11 may be provided on each of the left side and the right side in the lower portion of the main body 10.

The at least one driving wheel 11 may be provided on the left side and on the right side in the lower portion of the main body 10, and here, the at least one driving wheel 11 may be provided at positions in which the center of gravity is maintained when the main body 10 is in a stationary state or while the main body 10 is traveling.

In some implementations, the at least one driving wheel 11 may be provided as a pair, and the pair of driving wheels 11 may be provided on the left side and on the right side in the lower portion of the main body 10, respectively, and may be provided at the positions such that the main body 10 may be moved.

For example, the pair of driving wheels 11 may be provided on the left side and on the right side of a central portion of the main body 10, respectively.

The at least one driving wheel 11 may be connected to the main body 10 through a driving shaft.

The driving shaft may cause a traveling direction of the at least one driving wheel 11 to be changed.

The driving shaft may be changed together with a direction in which the main body 10 faces (of a facing direction of the main body 10).

For example, when the driving shaft is changed to the left side or to the right side, the facing direction of the main body 10 may be changed together with the driving shaft.

The driving shaft may also be changed separately from the main body 10.

For example, when the driving shaft is changed in a leftward direction or in a rightward direction, the facing direction of the main body 10 may also be changed together with the driving shaft.

The driving shaft may be changed separately from the main body 10.

For example, when the driving shaft is changed in a leftward direction or in a rightward direction, a facing direction of the main body 10 may be maintained, while only the driving shaft may be changed.

The at least one driving wheel 11 may cause a traveling direction to be changed through the driving shaft.

A traveling direction of the at least one driving wheel 11 may be a forward direction (12 o'clock direction) at normal times, and the traveling direction of the at least one driving wheel 11 may be changed by 360 degrees.

For example, the at least one driving wheel 11 moves in a diagonal direction in a northeast direction from a current location, a traveling direction of the at least one driving wheel 11 may be changed from the forward direction (12 o'clock direction) of the at least one driving wheel 11 may be changed by 360 degrees or the main body 10 may travel along a diagonal line.

In some implementations, a facing direction of the main body 10 may be changed (the 12 o'clock to 3 o'clock direction) together with the at least one driving wheel 11, or the facing direction of the main body 10 may be maintained in the forward direction (12 o'clock direction) and only a driving shaft of the at least one driving wheel 11 may be changed (12 o'clock to 3 o'clock direction).

The at least one driving wheel 11 may be controlled by the control unit 30.

For example, when the control unit 30 generates a signal regarding traveling of the main body 10 and delivers the generated signal to a driving module included in the at least one driving wheel 11, the driving module may drive the at least one driving wheel 11 according to the received signal.

The cleaning unit 12 may remove dust or a foreign object in the traveling route of the main body 10.

The cleaning unit 12 may remove dust or a foreign object in the traveling route while the main body 10 is traveling.

In some implementations, the cleaning unit 12 may perform cleaning of the cleaner 100.

The cleaning unit 12 may be provided in a lower portion of the main body 10.

The cleaning unit 12 may be provided on a front side in a lower portion of the main body 10.

In some implementations, the cleaning unit 12 may be provided as a pair.

The cleaning unit 12 may be provided on both sides of a front surface of the main body 10, for example, on the left side and on the right side of the front surface of the main body 10.

In some implementations, the cleaning unit 12 may be formed as a pair and the pair of cleaning units 12 may be provided on the left side and right sides of the front surface of the main body 10, respectively, to remove dust or a foreign object in the traveling route while the main body 10 is traveling.

The cleaning unit 12 may include a rotating brush installed to be rotatable, a side brush for cleaning the corner or a side of a cleaning area such as a wall surface, or the like, and a motor for driving the rotating brush or the side brush.

The cleaning unit 12 may further include a dust bin storing collected dust, a suction fan providing power for sucking dust, and a suction motor for sucking air by rotating the suction fan.

The cleaning unit 12 may further include a filter filtering out filth or dust in the air.

The cleaning unit 12 may include integration of the aforementioned components to remove dust or a foreign object in the traveling route.

The cleaning unit 12 may be controlled by the control unit 30.

For example, when the control unit 30 generates a signal regarding cleaning of the main body 10 and delivers the generated signal to the driving module included in the cleaning unit 12, the driving module may drive the cleaning unit 12 according to the received signal.

The main body 10 may include the at least one driving wheel 11 and the cleaning unit 12, and may further include a camera 13 for recognizing a position.

The camera 13 may interwork with the control unit 30 or may recognize a position through an internal processor module thereof.

The camera 13 may capture an image of a position of the main body 10 in real time to recognize a current position.

The camera 13 may recognize a current position by capturing an image of a position in real time while the main body 10 is traveling.

The camera 13 may recognize the current position by matching the current position to previously stored position information.

The camera 13 may be provided in an upper portion of the main body 10.

The camera 13 may be provided on a front surface in the upper portion of the main body 10.

The camera 13 may capture an image of a facing direction of the main body 10 to recognize a current position of the main body 10.

The camera 13 may generate data regarding recognized position information.

The data regarding the position information may be used as a basis for controlling traveling and cleaning of the main body 10.

The data regarding the position information may be coordinate information data indicating a recognized position as coordinates.

For example, the data regarding the position information may be coordinate information data indicated as [x, y, z].

The data regarding the position information may include an image data, or a photo image data.

The camera 13 may generate the data regarding the position information, and deliver the generated data to the control unit 30.

In the cleaner 100, the plurality of dust sensors 20a and 20b may be configured as at least a pair.

Hereinafter, an example in which the plurality of dust sensors 20a and 20b are configured as a pair will be described.

The plurality of dust sensors 20a and 20b may be provided in the mutually opposite directions which are symmetrical.

For example, as illustrated in FIGS. 1 and 2, the plurality of dust sensors 20a and 20b may be provided on the front side and on the rear side of the main body 10, respectively.

Since the plurality of dust sensors 20a and 20b are provided on the front side and on the rear side of the main body 10, respectively, the sensor 20a provided on the front side of the main body 10 may sense dust at the same time when the main body 10 travels along the traveling route, and the sensor 20b provide don the rear side of the main body 10 may sense dust after the main body 10 travels along the travelling route.

The plurality of dust sensors 20a and 20b may be provided in positions within a reference range at which the plurality of dust sensors pass through the same point when the main body 10 travels in a linear direction or when the main body 10 rotates in a traveling direction.

An example in which the plurality of dust sensors 20a and 20b pass through the same point within the reference range when the main body 10 travels in the linear direction will be described with reference to FIG. 3.

As illustrated in FIG. 3, in some implementations, the plurality of dust sensors 20a and 20b are provided in the same straight line on the plane of the main body 10, when the main body 10 travels along the traveling route in a linear direction, the other remaining sensor may pass through a point that any one of the plurality of dust sensors 20a and 20b has passed through.

In detail, while the main body 10 travels in a linear direction, any one (one sensor 20) among the plurality of dust sensors 20a and 20b passes through an area in which dust is present in the traveling route, and here, since the main body 10 travels in the linear direction, the other remaining one 20b among the plurality of dust sensors 20a and 20b may pass through the same area in which the one sensor 20a has passed through.

In some implementations, when the plurality of dust sensors 20a and 20b are provided to pass through the same point within the reference range as the main body 10 travels in the linear direction, it may mean that the plurality of dust sensors 20a and 20b are provided in the same straight line.

An example in which the plurality of dust sensors 20a and 20b pass through the same point within the reference range when the main body 10 rotates in the traveling direction will be described with reference to FIG. 4.

As illustrated in FIG. 4, in some implementations, the plurality of dust sensors 20a and 20b are provided in a circumference centering on the center of the main body 10, when the main body 10 rotates in the traveling direction, the other remaining one among the plurality of dust sensors 20a and 20b may pass through a point that any one among the plurality of dust sensors 20a and 20b has passed through.

In detail, in a state in which any one (one sensor) 20a among the plurality of dust sensors 20a and 20b is positioned in an area in which dust is present, when the main body rotates by 180 degrees in the traveling direction, the other remaining one sensor 20b among the plurality of dust sensors 20a and 20b may be positioned in the area in which the one sensor 20a has been placed and the one sensor 20a may be positioned in the area in which the other remaining one 20 has been placed, whereby the other remaining one sensor 20b, among the plurality of dust sensors 20a and 20b, may pass the area that the one sensor 20 has passed through, in the same manner.

In some implementations, when the plurality of dust sensors 20a and 20b are provided to pass through the same point within the reference range as the main body 10 rotates in the traveling direction, it may mean that the plurality of dust sensors 20a and 20b are provided in the circumference centered on the center of the main body 10.

The plurality of dust sensors 20a and 20b may be provided in a position in which dust on the traveling route is pre-sensed (e.g., first sensed) and a position in which dust on the traveling route is post-sensed (e.g., next sensed), respectively, when the main body 10 travels along the traveling route in a direction of the front side.

In some implementations, the plurality of dust sensors 20a and 20b may be provided in a front side and in a rear side of the main body 10.

Since the plurality of dust sensors 20a and 20b are provided on the front side and on the rear side of the main body 10, respectively, the sensor 20a provided on the front side may first sense dust on the traveling route and the sensor 20b provided on the rear side of the main body 10 may post-sense dust on the traveling route.

While the main body 10 is traveling, the plurality of dust sensors 20a and 20b may sense dust on the traveling route in real time and deliver the sensing result to the control unit 30.

In the cleaner 100, the control unit 30 may control traveling and cleaning of the main body 10 on the basis of the sensing result sensed by the plurality of dust sensors 20a and 20b in the traveling route in real time while the main body 10 is traveling.

The control unit 30 may set matters regarding traveling and cleaning of the main body 10.

For example, the control unit 30 may set which are the main body 10 is to travel, whether cleaning is to be performed when the main body 10 is traveling, and the like.

Setting regarding traveling and cleaning of the main body 10 may be performed on the basis of a user input received through an input device, or the like, provided on an outer side of the main body 10.

As for setting of the traveling route, traveling of a preset route, random traveling of the main body 10 according to a sensing result from the plurality of dust sensors 20a and 20b, or searching for a new route, and the like, may be set.

Setting of cleaning may include setting of strength of cleaning, whether to perform a special cleaning function, whether to perform cleaning repeatedly, and the like, when the main body 10 travels along a preset traveling path.

The control unit 30 may set a traveling route and a traveling mode of the main body 10 and control the main body 10 to clean the traveling route according to the set traveling mode.

For example, the traveling route is set to an area [Ka] and the traveling mode is set to mode [A] in which cleaning is performed at the same time of traveling, the control unit 30 may control the main body 10 to clean the area [Ka] in the mode [A].

The control unit 30 may recognize a position of the cleaner 100 and coordinate the position (or obtain coordinates of the position), and control traveling and cleaning of the main body 10 on the basis of the coordinate information.

The control unit 30 may recognize a current position of the cleaner 100 through a camera or a recognizing unit provided outside of the main body 10 and coordinate the position, store the coordinated information, and reflect the coordinated information when the traveling route of the main body 10 is set or changed, thereby controlling traveling and cleaning of the main body 10.

The control unit 30 may perform controlling on the basis of the sensing result from the plurality of dust sensors 20a and 20b.

The plurality of dust sensors 20a and 20b may include a first sensor 20a provided on the front side of the main body 10 and sensing dust in the traveling route and a second sensor 20b provided on the rear side of the main body 10 and sensing dust in the traveling route. The control unit 30 may recognize a current position of the main body 10, obtain coordinates of the recognized current position, and control traveling and cleaning of the main body 10 on the basis of the coordinate information regarding the current position and the sensing result from the plurality of dust sensors 20a and 20b.

The control unit 30 may control traveling of the main body 10 on the basis of the coordinate information.

For example, the control unit 30 may control the main body 10 to move to an area corresponding to the coordinate information.

The coordinate information may be stored in the form of (x, y) or (x, y, z).

The control unit 30 may control cleaning on a cleaning area according to a result obtained by comparing a first sensing result from the first sensor 20a and a preset first reference before cleaning the cleaning area.

The first sensing result may be a result of sensing dust present in the cleaning area before the main body 10 performs cleaning on the cleaning area.

The first reference may be a cleanliness reference according to a degree of dust present in the cleaning area.

In some implementations, the first sensing result is less than the first reference, it means that cleanness of the cleaning area is not good.

The first reference may be set to be different according to topography, a geographic feature, an object, and the like, of the cleaning area.

For example, the first reference may be set to be different according to a floor, a carpet, and the like.

When the first sensing result is less than the first reference according to the first sensing result and the result of comparison with the first reference, the control unit 30 may designate coordinates of the cleaning area as a general cleaning target area and store the coordinates.

For example, the control unit 30 may designate coordinates of the cleaning area as an[(x, y)] indicating a general cleaning target area, and store the same.

In some implementations, the first sensing result is less than the first reference, the control unit 30 may control the main body 10 to maintain cleaning in the cleaning area.

Here, when cleaning is maintained, it may mean that the cleaner 100 performs cleaning to an existing general cleaning state, rather than performing intensive cleaning.

In some implementations, the first sensing result is less than the first reference, the control unit 30 may determine that cleanness of the cleaning area is good so intensive cleaning is not required in the cleaning area and cause the cleaning state regarding the cleaning area to be maintained.

In some implementations, the first sensing result exceeds the first reference according to a result obtained by comparing the first sensing result with the first reference, the control unit 30 may designate coordinates of the cleaning area as an intensive cleaning target area and store the coordinates.

For example, the control unit 30 may designate coordinates of the cleaning area to bn[(x, y)] indicating an intensive cleaning target area, and store the designated coordinates.

In some implementations, the first sensing result exceeds the first reference, the control unit 30 may control the main body 10 to intensively clean the cleaning area no the basis of the position coordinates designated as the intensive cleaning target area.

In some implementations, the first sensing result exceeds the first reference, the control unit 30 may determine that cleanness of the cleaning area is not good so the cleaning area is in need to intensive cleaning, and control the main body 10 to intensively clean the cleaning area.

In some implementations, the cleaning area is intensively cleaned, the control unit 30 may reduce a traveling speed of the main body 10, may increase dust suction force of the main body 10, or may control the main body 10 to repeatedly clean the cleaning area a plurality of times.

After the cleaning area is cleaned, the control unit 30 may compare a difference between the first sensing result and the second sensing result of the second sensor with a preset second reference, and control traveling and cleaning of the main body 10 according to a comparison result.

The second sensing result may be a result obtained by sensing dust present in the cleaning area after the cleaning area is cleaned.

In some implementations, the second sensing result may be a cleaning result of removing dust present in the cleaning area.

In some implementations, when the first sensing result is greater than the second sensing result, it may mean that the cleaning area has been cleaned, and when the first sensing result is not greater than the second sensing result, it may mean that the cleaning area has not been cleaned.

The second reference may be a cleanliness reference according to a degree of dust present in the cleaning area and may be a cleanliness reference for determining a cleaning state of the cleaning area.

In some implementations, as the difference between the first sensing result and the second sensing result is greater than the second reference, it may mean that a cleaning state of the cleaning area is better.

In some implementations, the difference between the first sensing result and the second sensing result exceeds the preset second reference according to the result of comparing the difference between the first sensing result and the second sensing result of the second sensor with the second reference, the control unit 30 may control the main body 10 to move to an area other than the cleaning area.

In some implementations, the difference between the first sensing result and the second sensing result exceeds the preset second reference, the control unit 30 may determine that the cleaning area has been properly cleaned and control the main body 10 to move to an area other than the cleaning area.

For example, coordinates corresponding to the cleaning area is (an), the control unit 30 may control the main body 10 to move to a next cleaning target area of the cleaning area, for example, to coordinates (an+1), next coordinates of the coordinates (an).

In some implementations, the difference between the first sensing result and the second sensing result is equal to or smaller than the preset second reference, the control unit 30 may control traveling and cleaning of the main body 10 according to whether the cleaning area is designated.

In some implementations, the difference between the first sensing result and the second sensing result is equal to or smaller than the preset second reference and the cleaning area is the general cleaning target area, the control unit 30 may control the main body 10 to move to an area other than the cleaning area.

In some implementations, the difference between the first sensing result and the second sensing result is equal to or smaller than the preset second reference and the cleaning area is the general cleaning target area, a cleaning state of the cleaning area is good before cleaning, and thus, the control unit 30 may determine that it is not required to clean again the cleaning area, and control the main body 10 to move to an area other than the cleaning area.

In some implementations, the difference between the first sensing result and the second sensing result is equal to or smaller than the preset second reference and the cleaning area is the intensive cleaning target area, the control unit 30 may control the main body 10 to clean again the cleaning area.

In some implementations, the difference between the first sensing result and the second sensing result is equal to or smaller than the preset second reference and the cleaning area is the intensive cleaning target area, a clean state of the cleaning area is not good or cleaning has not been properly performed on the cleaning area, and thus, the control unit 30 determine that the cleaning area is required to be cleaned again, and control the main body 10 to clean again the cleaning area.

For example, coordinates corresponding to the cleaning area is (bn), the control unit 30 may control the main body 10 to be returned to the coordinates (bn) of the cleaning area and perform cleaning again.

In some implementations, the cleaning area is cleaned again, the control unit 30 may control the main body 10 to intensively clean the cleaning area.

In some implementations, the cleaning area is cleaned again, the control unit 30 may control the main body 10 to first clean an area other than the cleaning area, and clean again the cleaning area.

For example, coordinates corresponding to the cleaning area is (bn), the control unit 30 may control the main body 10 to move to the next cleaning target area of the cleaning area, for example, the next coordinates an+1 of the coordinates (an) or the next coordinates (bn+1) to first perform cleaning on the (an+1) or (bn+1), to be returned to (bn), and to clean (bn) again.

In some implementations, the cleaning area is cleaned again, the control unit 30 may control the main body 10 to immediately clean the cleaning area again.

For example, coordinates corresponding to the cleaning area is (bn), the control unit 30 may control the main body 10 to be returned to the coordinates (bn) of the cleaning area and immediately clean the area corresponding to the coordinates (bn) again.

In some implementations, the cleaning area is cleaned again, the control unit 30 may control the main body 10 to immediately clean the cleaning area again, and here, the control unit 30 may control the main body 10 to move back to the cleaning area to clean the cleaning area again, rather than turning the main body 10 in the traveling direction.

In some implementations, without turning the facing direction to the direction of the cleaning area, the main body 10 may move back to the cleaning area and clean the cleaning area again.

In some implementations, the main body 10 moves back, sensing order of the first sensor 20a and the second sensor 20b may be interchanged.

For example, when the cleaning area is first cleaned, the first sensor 20a may first sense dust in the cleaning area and the second sensor 20b senses dust in the cleaning area, but in some implementations, the cleaning area is required to be cleaned again so the main body 10 moves back, the second sensor 20b positioned at the rear side first passes through the cleaning area, and thus, the second sensor 20b may first sense dust in the cleaning area and the first sensor 20a may sense dust after the cleaning area is cleaned again.

In some implementations, when cleaning is performed first, the first sensor 20a performs a first sensing function of sensing a pre-cleaning state and the second sensor 20b performs a second sensing function of sensing a post-cleaning state, but when the cleaning is performed again, the second sensor 20b performs the first sensing function of sensing a pre-cleaning state and the first sensor 20a may perform the second sensing function of sensing the post-cleaning state.

Also, in some implementations, the cleaning area is cleaned again, the control unit 30 may control the main body 10 to turn the main body 10 by 180 degrees in the traveling direction and move forward to clean the cleaning area again.

In some implementations, the main body 10 may turn the facing direction to the direction of the cleaning area and move forward to travel to clean the cleaning area again.

In some implementations, the cleaning area is cleaned again, the control unit 30 may control the main body 10 to travel the cleaning area a plurality of times in a reciprocating manner such that the first sensing result according to the re-cleaning is equal to or less than the preset first reference.

In some implementations, when the main body 10 cleans the cleaning area again, the main body 10 may clean travel the cleaning area a plurality of times in a reciprocating manner to clean the cleaning area again until a clean state of the cleaning area is good and the first sensing result according to the re-cleaning is equal to or less than the preset first reference.

In some implementations, the cleaning area is cleaned again, the control unit 30 may control the main body 10 to travel the cleaning area a plurality of times in a reciprocating manner by a preset limited number of times to clean the cleaning area again such that the first sensing result according to the re-cleaning is equal to or less than the preset first reference.

The preset limited number of times may be set by the control unit 30.

The preset limited number of times may be set by the control unit 30 according to a clean state of the cleaning area.

For example, when a clean state of the cleaning area is low, the preset limited number of times may be set to be increased, and when a clean state of the cleaning area is high, the preset limited number of times may be set to be decreased.

Here, whether the cleaning area is clean may be set by the control unit 30 when the main body 10 first cleans the cleaning area, and may be determined according to a result obtained by comparing the first sensing result and the first reference.

When the first sensing result is not less than the preset first reference even after the main body 10 travels the cleaning area by the preset limited number of times in a reciprocating manner, the control unit 30 may control the main body 10 to stop cleaning again the cleaning area and move to an area other than the cleaning area.

After the main body 10 travels in the cleaning area by the preset limited number of times in a reciprocating manner, when the first sensing result is not less than the preset first reference, the control unit 30 may control the main body 10 to stop re-cleaning.

After the main body 10 travels in the cleaning area by the preset limited number of times in a reciprocating manner, when the first sensing result is not less than the preset first reference, the control unit 30 may determine that a clean state of the cleaning area may not be improved through the intensive repeated cleaning, so the control unit 30 may control the main body 10 to stop cleaning again the cleaning area and move to an area other than the cleaning area.

After the cleaning area is cleaned again, when the first sensing result according to the re-cleaning is less than the preset first reference, the control unit 30 may control the main body 10 to move to an area other than the cleaning area.

When the first sensing result according to the re-cleaning is less than the preset first reference, the control unit 30 may determine that the cleaning area has been properly cleaned again, not requiring additional re-cleaning, and control the main body 10 to move to an area other than the cleaning area.

Thereafter, the control unit 30 may control the main body 10 to perform traveling and cleaning by repeating the aforementioned process until all the cleaning target areas are completely cleaned.

An example cleaning process the cleaner 100 described above will be described with reference to FIG. 5.

When the cleaner 100 starts to travel to perform cleaning and starts to clean a cleaning area, the first sensor 20a and the second sensor 20b provided on the front side and on the rear side of the man body 10 may sense dust in the cleaning area (S0) as illustrated in FIG. 5.

The cleaner 100 may recognize a position of the cleaning area in real time to obtain coordinates of the position, and store the position coordinates (an) of the cleaning area (S1).

Here, the position coordinates (an) of the cleaning area may be designated and stored as a general cleaning target area (an) at an initial stage, but according to the necessity of intensive cleaning regarding the cleaning area, the general cleaning target area (an) may be designated and stored as an intensive cleaning target area (bn).

The cleaner 100 may compare a sensing result from the first sensor regarding the cleaning area with a first reference, and perform cleaning on the cleaning area according to the comparison result (S2).

When the first sensing result is higher than the first reference, the cleaner 100 may determine that cleanness of the cleaning area is not good so intensive cleaning is required, designate and store position coordinates (an) of the cleaning area as intensive cleaning target area (bn) (S3), and intensively cleaning the cleaning area (S4).

In some implementations, the first sensing result is lower than the first reference, the cleaner 100 may determine that cleanness of the cleaning area is so good that intensive cleaning is not required, maintain the position coordinates (an) of the cleaning area as a general cleaning target area an, and maintain cleaning on the cleaning area (S3').

The cleaner 100 may compare a difference between the first sensing result and a sensing result from the second sensor with a second reference, and perform cleaning and traveling according to the comparison result (S5).

In some implementations, the difference between the first sensing result and the sensing result from the second sensor exceeds the second reference, the cleaner may move to an area other than the cleaning area, for example, a next cleaning area (S6').

In some implementations, the difference between the first sensing result and the sensing result from the second sensor exceeds the second reference, the cleaner 100 may determine that a cleaning state of the cleaning area is so good that re-cleaning thereof is not required, move to coordinates (an+1) of an area other than the cleaning area and maintain cleaning and traveling (S6').

In some implementations, the difference between the first sensing result and the sensing result from the second sensor is lower than the second reference (S6) and the cleaning area is the general cleaning target area (an), the cleaner 100 may move the an area other than the cleaning area, for example, a next cleaning area (S6').

In some implementations, the difference between the first sensing result and the sensing result from the second sensor is lower than the second reference (S6) and the cleaning area is the general cleaning target area (an), the cleaner 100 may determine that a clean state of the cleaning area is good before cleaning so it is not required to clean the cleaning area again, move to the coordinates (an+1) of the area other than the cleaning area, and maintain cleaning and traveling (S6').

In some implementations, the difference between the first sensing result and the second sensing result is lower than the second reference (S6) and the cleaning area is the intensive cleaning target area (bn), the cleaner 100 may clean the cleaning area (S7).

In some implementations, the difference between the first sensing result and the second sensing result is lower than the second reference (S6) and the cleaning area is the intensive cleaning target area (bn), the cleaner 100 may determine that a cleaning state of the cleaning area is not good before cleaning or the cleaning area has not been properly cleaned so it is required to be cleaned again, and perform cleaning the cleaning area again (S7).

The cleaner 100 may perform cleaning and traveling repeatedly in each cleaning area by performing the aforementioned process.

The control unit 30 may control traveling and cleaning of the main body 10 through the aforementioned process, and may control to perform an additional function of the cleaner 100.

As illustrated in FIG. 6, the control unit 30 may control the at least one driving wheel 11, the cleaning unit 12, the camera 13, and the plurality of dust sensors 20a and 20b to perform their respective functions, and may further control a power supply unit 14, a communication unit 15, a storage unit 16, and an input/output unit 17 to perform their respective functions.

The power supply unit 14, the communication unit 15, the storage unit 16, and the input/output unit 17 may be components additionally provided in the main body 10.

The power supply unit 14 may perform a power function of the cleaner 100.

In some implementations, the power supply unit 14 may be configured as a battery that may be charged and discharged.

The power supply unit 14 may supply charged power to the components provided in the cleaner 100 to drive the cleaner 100.

In some implementations, the cleaner 100 may be driven by the power supply unit 14.

The communication unit 15 may perform a communication function with an external device.

The communication unit 15 may perform communication with a terminal capable of remotely controlling the cleaner 100 or a higher device of the cleaner 100.

The communication unit 15 may transmit data regarding communication with an external device to the control unit 30 such that a communication result may be reflected in the cleaner 100.

For example, a control signal regarding traveling of the main body 10 is transmitted from an external terminal, the communication unit 15 may transmit corresponding data to the control unit 30 so that the control unit 30 may perform controlling according to the communication data.

The storage unit 16 may perform a data storage function of the cleaner 100.

The storage unit 16 may store data regarding a traveling record and a cleaning record, control data of the control unit 30, position coordinate information, and the like, so that the control unit 30 may reflect the stored data in controlling traveling and cleaning of the main body 10.

The input/output unit 17 may perform an input/output function regarding an operation or controlling of the cleaner 100.

The input/output unit 17 may include an input unit and an output unit.

The input unit may receive a command signal regarding an operation or controlling of the cleaner from the outside.

For example, the input unit may receive a signal regarding driving, an operation, or controlling of the cleaner 100 from a remote control unit for controlling the cleaner 100 or from a user of the cleaner 100.

The input unit may deliver the received signal to the control unit 30 so that the control unit 30 may control traveling and cleaning of the main body 10 according to the received signal.

The output unit may output a state regarding an operation or controlling of the cleaner 100 to the outside.

The output unit may output a state regarding an operation or controlling of the cleaner 100 through an audio or image display scheme.

For example, a voice announcement, an alarm sound, a guidance sound, a display regarding an operation or controlling of the cleaner 100.

In addition to the components described above, the control unit 30 may control other components to perform a function of the cleaner 100.

Hereinafter, a method for controlling a robot cleaner disclosed in the present disclosure will be described.

Figure 7:
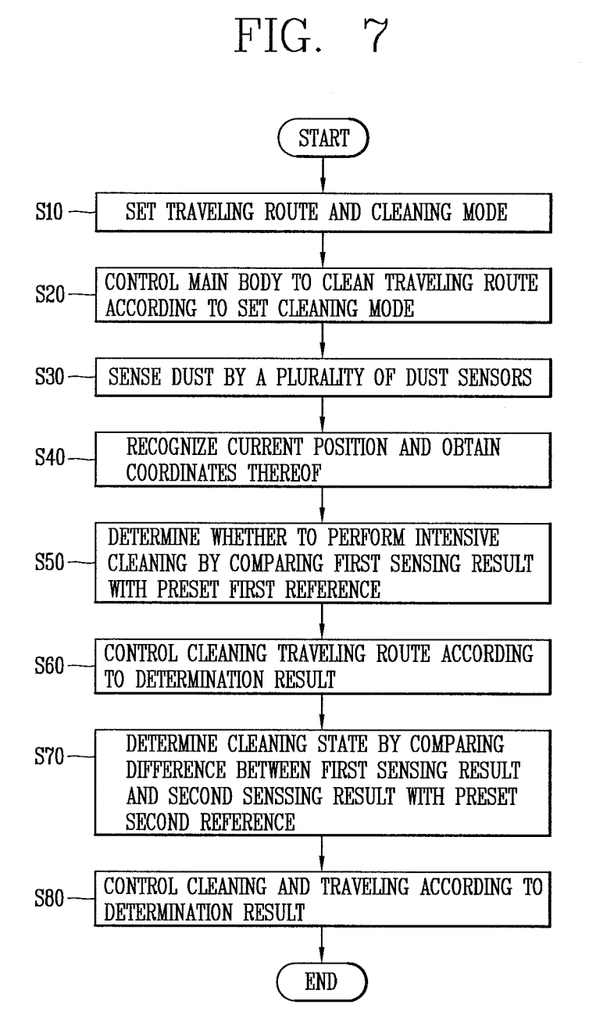
FIG. 7 is a flow chart of an example method for controlling an example robot cleaner.

FIG. 7 illustrates an example method for controlling a robot cleaner.

A method for controlling a robot cleaner disclosed in the present disclosure (hereinafter, referred to as a "control method") is a method for controlling a robot cleaner which cleans and travels on the basis of a sensing result of a plurality of dust sensors.

The control method may be a method for controlling a robot cleaner described above.

The control method may be a method for controlling a robot cleaner including a plurality of dust sensors, as well as the cleaner described above.

The control method may be performed in order as illustrated in FIG. 7.

As illustrated in FIG. 7, the control method may include a step (S10) of setting a traveling route and a cleaning mode, a step (S20) of performing control to clean a cleaning area in the traveling route according to the set cleaning mode, a step (S30) of sensing dust in the cleaning area by a plurality of dust sensors, a step (S40) of recognize a current position and obtaining coordinates of the recognized position, a step (S50) of comparing a first sensing result of a first sensor among the plurality of dust sensors with a preset first reference to determine whether intensive cleaning is required to be performed, a step (S60) of cleaning the cleaning area according to the result of determining whether intensive cleaning is required to be performed, a step (S70) of comparing a difference between the first sensing result and a second sensing result of a second sensor among the plurality of dust sensors with a second reference to determine a cleaning state of the cleaning area, and a step (S80) of controlling cleaning and traveling according to the result of determining a cleaning state of the cleaning area.

The control method may be performed by a control unit included in the cleaner to which the control method is applied.

The control method may be a method for controlling a cleaner by the control unit.

A basic operation of the cleaner and a process of controlling the basic operation of the cleaner by the control unit may be the same as that of the cleaner described above.

In the control method, the first sensor may be provided on a front side of the robot cleaner to pre-sense dust in the traveling route.

In the control method, the second sensor may be provided on a rear side of the robot cleaner to post-sense dust in the traveling route.

Hereinafter, an example control method will be described by omitting portions overlapping with the description of the cleaner described above.

In the step (S10) of setting the traveling route and cleaning mode, a route in which the cleaner is to travel and a cleaning mode in which the travelling route is to be performed may be set.

As for setting of the traveling route, a cleaning area, traveling of a preset route, random traveling according to a sensing result from the plurality of dust sensors 20a and 20b, or searching for a new route, and the like, may be set.

Setting of cleaning may include setting of strength of cleaning, whether to perform a special cleaning function, whether to perform cleaning repeatedly, and the like, when the cleaner travels along a preset traveling path.

In the step (S20) of performing control to clean the cleaning area in the traveling route, the cleaner may be controlled to start traveling.

In the step (S20) of performing control to clean the cleaning area in the traveling route, the cleaner may be controlled to travel and perform clean along the traveling route and the cleaning mode set in the step (S10) of setting the traveling route and the cleaning mode.

In the step (S30) of sensing dust on the traveling route by the plurality of dust sensors, the first sensor and the second sensor may sense dust in the cleaning area.

In the step (S40) of recognizing a current position and obtaining coordinates of the recognized position, a current position of the cleaner may be recognized through a camera or a recognizing unit provided outside of the cleaner and coordinates thereof are obtained, and the obtained coordinates may be stored.

In the step (S40) of recognizing the current position and obtaining coordinates of the recognized position, a position of the cleaning area may be recognized in real time and coordinates thereof are obtained, and the position coordinates of the cleaning area may be designated and stored as a general cleaning target area.

In the step (S50) of determining whether to perform intensive cleaning by comparing the first sensing result of the first sensor among the plurality of dust sensors with the first reference, the first sensing result is compared with the first reference, and when the first sensing result is lower than the first reference, the position coordinates of the cleaning area are maintained as a general cleaning target area and a cleaning state is determined to be maintained, and when the first sensing result exceeds the first reference, the position coordinates of the cleaning area are designated and stored as an intensive cleaning target area, and the cleaning area is determined to be intensively cleaned.

In the step (S50) of determining whether to perform intensive cleaning by comparing the first sensing result of the first sensor among the plurality of dust sensors with the first reference, when the first sensing result is lower than the first reference according to a result of comparing the first sensing result and the first reference, it is determined that cleanness of the cleaning area is so good that the cleaning area is not required to be intensively cleaned and position coordinates of the cleaning area are maintained as a general cleaning target area and cleaning on the cleaning area is determined to be maintained.

In the step (S50) of determining whether to perform intensive cleaning by comparing the first sensing result of the first sensor among the plurality of dust sensors with the first reference, when the first sensing result exceeds the first reference according to a result of comparing the first sensing result and the first reference, it is determined that cleanness of the cleaning area is not good and the cleaning area is required to be intensively cleaned, the position coordinates of the cleaning area are designated and stored as the intensive cleaning target area, and the cleaning area may be determined to be intensively cleaned.

In the step (S60) of cleaning the cleaning area according to the result of determining whether intensive cleaning is to be performed, when it is determined that cleaning on the cleaning area is determined to be maintained in the step (S50) of determining whether to perform intensive cleaning by comparing the first sensing result of the first sensor among the plurality of dust sensors with the first reference, it may be controlled such that cleaning on the cleaning area is maintained.

In the step (S60) of cleaning the cleaning area according to the result of determining whether intensive cleaning is to be performed, when it is determined that it is determined to intensively clean the cleaning area in the step (S50) of determining whether to perform intensive cleaning by comparing the first sensing result of the first sensor among the plurality of dust sensors with the first reference, it may be controlled such that the cleaning area is intensively cleaned.

In the step (S70) of determining a cleaning state of the cleaning area, in some implementations, a difference between the first sensing result and the second sensing result exceeds a preset second reference, it is determined that a cleaning state of the cleaning area is so good that additional cleaning is not required and may be determined that an area other than the cleaning area is cleaned.

In the step (S70) of determining a cleaning state of the cleaning area, in some implementations, a difference between the first sensing result and the second sensing result is less than the preset second reference and the cleaning area is not intensively cleaned, since a clean state of the cleaning area is good before cleaning, and thus, it may be determined that the cleaning area is not required to be cleaned again and it may be determined that an area other than the cleaning area is cleaned.

In the step (S70) of determining a cleaning state of the cleaning area, in some implementations, a difference between the first sensing result and the second sensing result is less than the preset second reference and the cleaning area is intensively cleaned, since a clean state of the cleaning area has not been good or since cleaning has not been properly performed on the cleaning area, it may be determined that the cleaning area is required to be cleaned again and it may be determined that the cleaning area is cleaned again.

In the step (S80) of controlling cleaning and traveling according to the result of determining the cleaning state of the traveling route, in some implementations, an area other than the cleaning area is determined to be cleaned in the step (S70) of determining a cleaning state of the cleaning area, it may be controlled such that an area other than the cleaning area is cleaned.

In the step (S80) of controlling cleaning and traveling according to the result of determining the cleaning state of the traveling route, in some implementations, the cleaning area is determined to be cleaned again in the step (S70) of determining a cleaning state of the cleaning area, it may be controlled such that the cleaning area is cleaned again.

The control method including the sequential steps described above may be combined with an example cleaner.

The robot cleaner and the method for controlling the robot cleaner of the present disclosure may be applied to any cleaning robot, an automatic cleaner, and a control method thereof to which the technical concept of the present disclosure is applicable.

The robot cleaner and the method for controlling the robot cleaner of the present disclosure may have an effect of determining whether cleaning has been properly performed in a traveling route by determining a cleaning state of the traveling route on the basis of a sensing result of a plurality of dust sensors.

The robot cleaner and the method for controlling the robot cleaner of the present disclosure may have an effect of performing cleaning again on the traveling route by determining whether cleaning has been properly performed in a traveling route by determining a cleaning state of the traveling route on the basis of a sensing result of a plurality of dust sensors and reflecting the determination in controlling traveling and cleaning.

The robot cleaner and the method for controlling the robot cleaner of the present disclosure may have an effect of perfectly performing cleaning on the traveling route by performing cleaning again on the traveling route.

What is claimed is:

1. A robot cleaner comprising:
a main body forming an external appearance;
a plurality of dust sensors provided at different positions of the main body and sensing dust in a traveling route of the main body; and
a control unit configured to control traveling and cleaning of the main body on the basis of sensing results from the plurality of dust sensors, wherein the plurality of dust sensors include: a first sensor provided on a front side of the main body to pre-sense dust on the traveling route; and a second sensor provided on a rear side of the main body to post-sense dust on the traveling route, wherein the control unit recognizes a current position of the main body, obtains coordinates of the current position, and controls traveling and cleaning of the main body on the basis of the coordinate information regarding the current position and the sensing results from the plurality of dust sensors.

2. The robot cleaner of claim 1, wherein the plurality of dust sensors are provided in positions at which the plurality of dust sensors pass through the same point when the main body travels in a linear direction or when the main body rotates in a traveling direction.

3. The robot cleaner of claim 1, wherein the control unit controls the main body to perform cleaning on a cleaning area according to a result obtained by comparing a first sensing result of the first sensor and a preset first reference before cleaning the cleaning area, and when the first sensing result exceeds the first reference, the control unit designates and stores position coordinates of the cleaning area as an intensive cleaning target area and controls the main body to intensively clean the cleaning area on the basis of the position coordinates designated as the intensive cleaning target area.

4. The robot cleaner of claim 3, wherein when the cleaning is intensively cleaned, the control unit reduces a traveling speed of the main body, increases a dust suction force of the main body, or instructs cleaning of the cleaning area repeatedly.

5. The robot cleaner of claim 3, wherein the control unit controls traveling and cleaning of the main body according to a result obtained by comparing a difference between the first sensing result and a second sensing result of the second sensor with a preset second reference after a cleaning is performed, and
when the difference between the first sensing result and the second sensing result exceeds the preset second reference, the control unit controls the main body to move to an area other than the cleaning area.

6. The robot cleaner of claim 5, wherein
when the difference between the first sensing result and the second sensing result is lower than the preset second reference, and
when the cleaning area is the intensive cleaning target area, the control unit controls the main body to move to an area other than the cleaning area, and
when the cleaning area is the intensive cleaning target area, the control unit controls the main body to clean again the cleaning area.

7. The robot cleaner of claim 6, wherein when the cleaning area is to be cleaned again, the control unit controls the main body to intensively clean the cleaning area.

8. The robot cleaner of claim 6, wherein when the cleaning area is to be cleaned again, the control unit controls the main body to first clean an area other than the cleaning area and
subsequently clean again the cleaning area.

9. The robot cleaner of claim 6, wherein when the cleaning area is to be cleaned again, the control unit controls the main body to immediately clean the cleaning area again.

10. The robot cleaner of claim 9, wherein the control unit controls the main body to move back to clean again the cleaning area, without turning the traveling direction of the main body.

11. The robot cleaner of claim 9, wherein the control unit controls the main body to turn the traveling direction of the main body by 180 degrees and move forward in the cleaning area to clean again the cleaning area.

12. The robot cleaner of claim 6, wherein the control unit controls the main body to travel the cleaning area a plurality of times in a reciprocating manner such that the first sensing result according to re-cleaning is lower than the preset first reference.

13. The robot cleaner of claim 12, wherein after the main body travels the cleaning area by a preset limited number of times in a reciprocating manner, when the first sensing result is not lower than the preset first reference, the control unit controls the main body to stop cleaning again.

* * * * *